(12) United States Patent
Chen et al.

(10) Patent No.: US 9,669,716 B1
(45) Date of Patent: Jun. 6, 2017

(54) ENERGY CHARGE CONTROLLER, ENERGY CHARGE CONTROLLING SYSTEM AND METHOD THEREOF

(71) Applicant: Automotive Research & Testing Center, Changhua County (TW)

(72) Inventors: Chien-An Chen, Changhua County (TW); Po-Hsu Lin, Changhua County (TW); Chin-Feng Tsai, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 57 days.

(21) Appl. No.: 14/968,908

(22) Filed: Dec. 15, 2015

(51) Int. Cl.
| | |
|---|---|
| *B60L 7/18* | (2006.01) |
| *B60L 7/16* | (2006.01) |
| *B60L 11/18* | (2006.01) |
| *B60L 15/20* | (2006.01) |
| *B60W 10/24* | (2006.01) |

(52) U.S. Cl.
CPC ........ *B60L 7/18* (2013.01); *B60L 7/16* (2013.01); *B60L 11/1809* (2013.01); *B60L 11/1851* (2013.01); *B60L 15/2045* (2013.01); *B60W 10/24* (2013.01); *B60L 2210/40* (2013.01); *B60L 2240/12* (2013.01); *B60L 2250/18* (2013.01); *B60L 2250/26* (2013.01); *Y02T 10/7283* (2013.01)

(58) Field of Classification Search
None
See application file for complete search history.

(56) References Cited

U.S. PATENT DOCUMENTS

| | | | |
|---|---|---|---|
| 7,034,482 B2 * | 4/2006 | Komiyama | B60K 6/46 180/65.24 |
| 2015/0081152 A1 * | 3/2015 | Lu | B60L 11/1851 701/22 |

FOREIGN PATENT DOCUMENTS

| | | |
|---|---|---|
| CN | 101161523 B | 2/2013 |
| CN | 103328294 A | 9/2013 |
| CN | 103448545 A | 12/2013 |
| CN | 104040828 A | 9/2014 |
| CN | 104590036 A | 5/2015 |

* cited by examiner

*Primary Examiner* — Russell Frejd
(74) *Attorney, Agent, or Firm* — CKC & Partners Co., Ltd.

(57) ABSTRACT

An energy charge controller for controlling electrical energy of a vehicle includes an estimation module and a control module. The estimation module includes a driver behavior judgment unit, a charge curve adjustment unit and an energy charge evaluation unit. The driver behavior judgment unit is configured to generate and output a driving mode signal. The driving mode signal is evaluated to generate a brake charging target datum by the charge curve adjustment unit. The brake charging target datum and a vehicle speed are evaluated to generate a chargeable braking energy value by the energy charge evaluation unit. The control module is configured to store a plurality of situational conditions, and select and output one of the situational conditions to the vehicle by comparing the chargeable braking energy value and a recoverable storage power value from an energy storage device.

10 Claims, 5 Drawing Sheets

ENERGY CHARGE CONTROLLER, ENERGY CHARGE CONTROLLING SYSTEM AND METHOD THEREOF

BACKGROUND

Technical Field

The present disclosure relates to an energy charge controller, an energy charge controlling system and an energy charge controlling method. More particularly, the energy charge controller, the energy charge controlling system and the energy charge controlling method have adaptive energy control for improving energy recovery efficiency.

Description of Related Art

In recent years, the development of electric vehicles has gained interest due to an increased awareness in environment protection, fuel conservation, and energy independency. In order to conserve more energy, recycling electric energy generated from braking of the electric vehicles to a rechargeable battery become an important development goal.

Based on current large-sized storage batteries and the large charge rate of capacitors, a combination of storage batteries and capacitors of hybrid electric vehicle is a preferred option of the system. However, the capacitor having a large charge rate has a problem on its small capacity. When the storage batteries are fully charged with only capacitors working in the system, it is easy to cause a problem of no electric brake in the procedure of energy charge. There are two solutions for solving the problem. The first solution is to reduce braking power in advance, and the second solution is to cancel the electric braking after capacitors are fully charged. The braking of the first solution is smoother than the braking of the second solution in the braking procedure. However, the braking power is very small, and most of the kinetic energy will be converted into heat and cannot be recycled. On the other hand, the capacitors in the second solution are fully charged and cannot absorb all the kinetic energy at high speed, so that the electric braking will suddenly disappear to affect the comfort of passengers. In addition, the conventional electric vehicles should consider the charge timing and charge conditions of the battery, so that its recovery efficiency is limited.

Another conventional method of energy charge is to use ultra-capacitors for recycling energy of the electric vehicle. However, such ultra-capacitors are impractical due to high cost, excessive weight and huge volume. Therefore, it is commercially desirable to develop a controlling system and method with low cost, simple structure, high recovery efficiency and long life of the storage element.

SUMMARY

According to one aspect of the present disclosure, an energy charge controller for controlling electrical energy of a vehicle includes an estimation module and a control module. The estimation module includes a driver behavior judgment unit, a charge curve adjustment unit and an energy charge evaluation unit. The driver behavior judgment unit is configured to generate and output a driving mode signal by a vehicle speed, an accelerator pedal motion signal and a brake pedal motion signal. The charge curve adjustment unit is electrically connected to the driver behavior judgment unit for receiving the driving mode signal from the driver behavior judgment unit. The driving mode signal is evaluated to generate a brake charging target datum by the charge curve adjustment unit. The energy charge evaluation unit is electrically connected to the charge curve adjustment unit for receiving the brake charging target datum and the vehicle speed. The brake charging target datum and the vehicle speed are evaluated to generate a chargeable braking energy value by the energy charge evaluation unit. The control module is electrically connected to the estimation module for receiving the chargeable braking energy value and at least one recoverable storage power value. The control module includes a control unit and a memory unit. The memory unit is electrically connected to the control unit and stored a plurality of situational conditions, and the control unit is configured to select and output one of the situational conditions to the vehicle by comparing the chargeable braking energy value and the recoverable storage power value.

According to another aspect of the present disclosure, an energy charge controlling system includes a power divider, an energy storage device, a load device and an energy charge controller. The power divider is configured to receive an electric power. The energy storage device is electrically connected to the power divider. The energy storage device includes a first storage element and generates a first recoverable storage power value, and the first storage element is corresponding to the first recoverable storage power value. The load device is electrically connected to the power divider. The energy charge controller is electrically connected to the power divider and the energy storage device. The energy charge controller includes an estimation module and a control module. The estimation module includes a driver behavior judgment unit, a charge curve adjustment unit and an energy charge evaluation unit. The driver behavior judgment unit is configured to generate and output a driving mode signal by a vehicle speed, an accelerator pedal motion signal and a brake pedal motion signal. The charge curve adjustment unit is electrically connected to the driver behavior judgment unit for receiving the driving mode signal from the driver behavior judgment unit. The driving mode signal is evaluated to generate a brake charging target datum by the charge curve adjustment unit. The energy charge evaluation unit is electrically connected to the charge curve adjustment unit for receiving the brake charging target datum and the vehicle speed. The brake charging target datum and the vehicle speed are evaluated to generate a chargeable braking energy value by the energy charge evaluation unit. The control module is electrically connected to the estimation module for receiving the chargeable braking energy value and the first recoverable storage power value. The control module includes a control unit and a memory unit. The memory unit is electrically connected to the control unit and stored a plurality of situational conditions. The control unit is configured to select and output one of the situational conditions to the power divider by comparing the chargeable braking energy value and the first recoverable storage power value. The electric power is assigned to the energy storage device by the power divider according to one of the situational conditions.

According to further another aspect of the present disclosure, an energy charge controlling method includes a driver behavior judging step, a charge curve adjusting step, an energy charge evaluating step and a controlling step. The driver behavior judging step is for evaluating a driving mode signal by a driver behavior judgment unit based on a vehicle speed, an accelerator pedal motion signal and a brake pedal motion signal. The charge curve adjusting step is for evaluating a brake charging target datum by a charge curve adjustment unit based on the driving mode signal. The energy charge evaluating step is for evaluating a chargeable braking energy value by an energy charge evaluation unit based on the brake charging target datum and the vehicle speed. The controlling step is for selecting and outputting one of a plurality of situational conditions based on comparing the chargeable braking energy value and the recoverable storage power value by a control unit.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
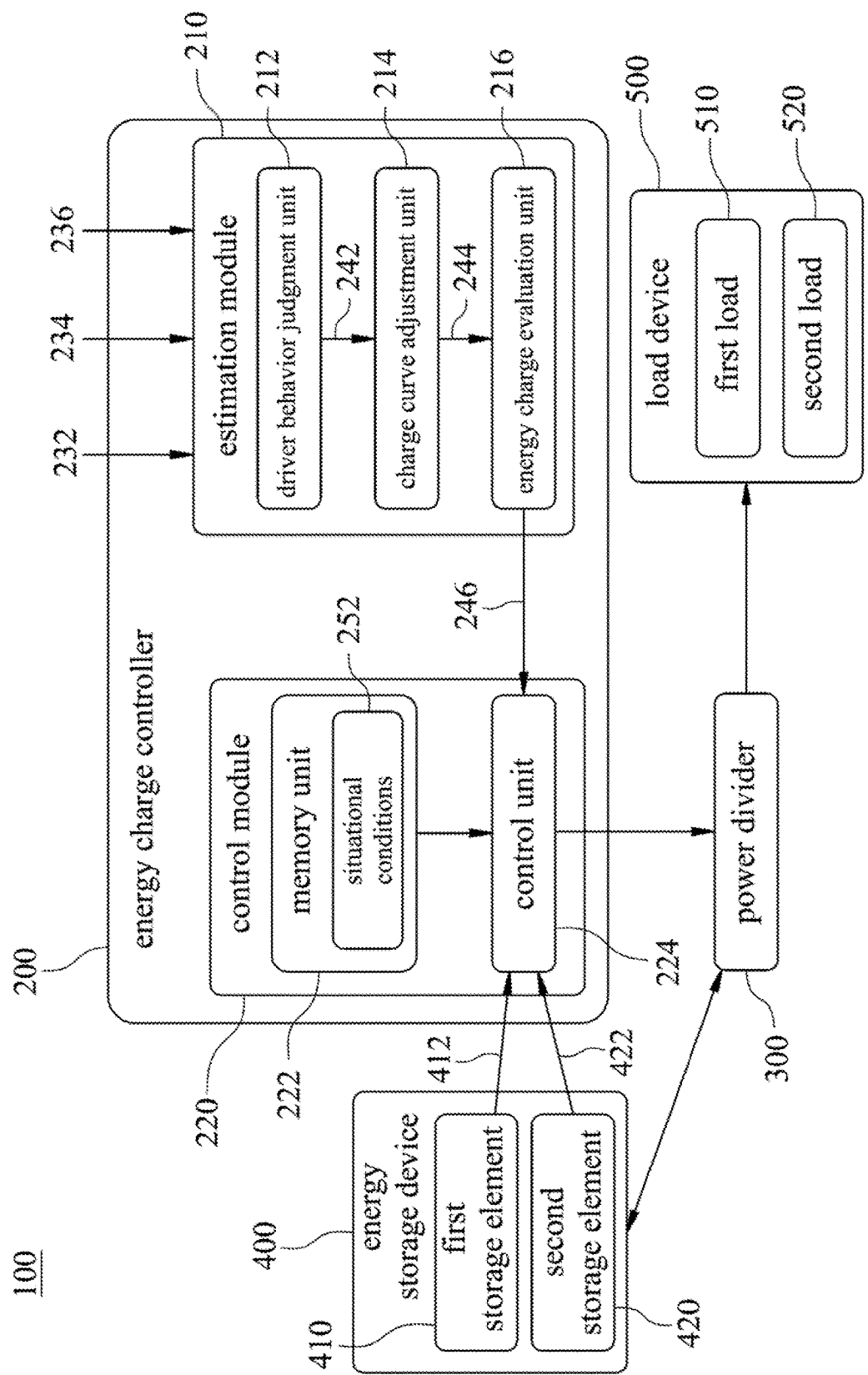
FIG. 1 is a block diagram showing an energy charge controlling system according to one embodiment of the present disclosure.

FIG. 1 is a block diagram showing an energy charge controlling system 100 according to one embodiment of the present disclosure. In FIG. 1, the energy charge controlling system 100 for controlling electrical energy of a vehicle includes an energy charge controller 200, a power divider 300, an energy storage device 400 and a load device 500. The energy charge controller 200 is electrically connected to the power divider and the energy storage device. The energy charge controller 200 includes an estimation module 210 and a control module 220. The estimation module 210 includes a driver behavior judgment unit 212, a charge curve adjustment unit 214 and an energy charge evaluation unit 216. The driver behavior judgment unit 212 is configured to generate and output a driving mode signal 242 by a vehicle speed 232, an accelerator pedal motion signal 234 and a brake pedal motion signal 236. In detail, the driver behavior judgment unit 212 is configured to output the driving mode signal 242 to the charge curve adjustment unit 214. The vehicle speed 232 indicates a vehicle velocity value. The accelerator pedal motion signal 234 indicates an accelerator pedal depth value TPS. The brake pedal motion signal 236 indicates a brake pedal depth value B. The driver behavior judgment unit 212 analyzes five judgment signals which are the accelerator pedal depth value TPS, a variation of the accelerator pedal depth value per unit time ΔTPS, the brake pedal depth value B, a variation of the brake pedal depth value per unit time ΔB and a variation of the vehicle velocity value per unit time ΔV. The driver behavior judgment unit 212 separates the driving behavior into four driving modes by the five judgment signals. The four driving modes are an acceleration mode, a sliding acceleration mode, a deceleration mode and a sliding deceleration mode, respectively, as shown in Table 1.

TABLE 1

| Driving mode | Judgment signal | | | | |
| --- | --- | --- | --- | --- | --- |
| | TPS | ΔTPS | B | ΔB | ΔV |
| Acceleration mode | >A1 | >A2 | — | — | >B1 |
| Sliding acceleration mode | <A1 | <A2 | — | — | <B1 |
| Deceleration mode | — | — | >C1 | >C2 | >D1 |
| Sliding deceleration mode | — | — | <C1 | <C2 | <D1 |

In Table 1, A1 represents a predetermined accelerator value. A2 represents a predetermined accelerator variation value. C1 represents a predetermined brake value. C2 represents a predetermined brake variation value. B1 and D1 represent predetermined velocity variation values. A1, A2, C1, C2, B1 and D1 are all predetermined values stored in the driver behavior judgment unit 212. The predetermined values are compared with the judgment signals by the driver behavior judgment unit 212 to judge one of the driving modes, so that the driver behavior judgment unit 212 can output the driving mode signal 242 which is corresponding to one of the driving modes. At the same time, the driver behavior judgment unit 212 outputs a sliding time, a speed value at the beginning of the sliding time and a speed value at the end of the sliding time to the charge curve adjustment unit 214 based on one of the driving modes. The judgment technology of the driver behavior judgment unit 212 is well known in the art and will not be described in detail herein.

The charge curve adjustment unit 214 is electrically connected to the driver behavior judgment unit 212 for receiving the driving mode signal from the driver behavior judgment unit 212. The driving mode signal 242 is evaluated to generate a brake charging target datum 244 by the charge curve adjustment unit 214. In detail, the charge curve adjustment unit 214 receives the sliding time, the speed value at the beginning of the sliding time and the speed value at the end of the sliding time from the driver behavior judgment unit 212. The sliding time, the speed value at the beginning of the sliding time and the speed value at the end of the sliding time are evaluated to generate a plurality of acceleration values by the charge curve adjustment unit 214, and then a mean value of the acceleration values is evaluated from the charge curve adjustment unit 214. Moreover, a brake charging reference datum is stored in the charge curve adjustment unit 214 in advance. The brake charging reference datum includes a plurality of predetermined vehicle speeds which decrease over time. Hence, the mean value of the acceleration values and the brake charging reference datum are evaluated to generate the brake charging target datum 244 by the charge curve adjustment unit 214. The brake charging target datum 244 includes a target vehicle speed which changes over time. The adjustment technology of the charge curve adjustment unit 214 is well known in the art and will not be described in detail herein.

The energy charge evaluation unit 216 is electrically connected to the charge curve adjustment unit 214 for receiving the brake charging target datum 244 and the vehicle speed signal 232. The brake charging target datum 244 and the vehicle speed signal 232 are evaluated to generate a chargeable braking energy value 246 by the energy charge evaluation unit 216. In detail, the vehicle velocity value of the vehicle speed signal 232 and the target vehicle speed of the brake charging target datum 244 are evaluated to generate a chargeable braking energy E(t) and its corresponding power P(t). The chargeable braking energy E(t) and the power P(t) satisfy the following equations (1) and (2), respectively.

$$E(t) = 1/2M(V_1^2 - V_2^2) \qquad (1)$$

$$P(t) = E(t)/T \qquad (2)$$

wherein $V_1$ and $V_2$ represent the vehicle velocity value and the target vehicle speed, respectively. The vehicle velocity value $V_1$ is large than the target vehicle speed $V_2$. M represents the mass of the vehicle. T represents a time interval of each sampling of the vehicle velocity in the energy charge controller 200. The chargeable braking energy value 246 represents a magnitude of the chargeable braking energy E(t).

The control module 220 is electrically connected to the estimation module 210 for receiving the chargeable braking energy value 246, a first recoverable storage power value 412 and a second recoverable storage power value 422. The control module 220 includes a control unit 224 and a memory unit 222. The memory unit 222 is electrically connected to the control unit 224 and stored a plurality of situational conditions 252. The control unit 224 is configured to select and output one of the situational conditions 252 to the power divider 300 by comparing the chargeable braking energy value 246, the first recoverable storage power value 412 and the second recoverable storage power value 422, so that an electric power can be assigned to the energy storage device 400 and the load device 500 by the power divider 300 according to one of the situational conditions 252. In detail, the control unit 224 stores five situational conditions 252 which are a first situational condition, a second situational condition, a third situational condition, a fourth situational condition and a fifth situational condition, respectively. The first situational condition indicates that the electric power is assigned to a first storage element 410 and a second storage element 420 at the same time by the power divider 300, so that the first storage element 410 and the second storage element 420 are charged at the same time. The second situational condition indicates that the electric power is assigned only to the first storage element 410 by the power divider 300, so that the first storage element 410 is charged. The third situational condition indicates that the electric power is assigned to the first storage element 410 and a second load 520 by the power divider 300, so that the first storage element 410 is charged by a part of the electric power, and the other part of the electric power is supplied to the second load 520. The fourth situational condition indicates that the electric power is assigned to the second storage element 420 and a first load 510 by the power divider 300, so that the second storage element 420 is charged by a part of the electric power, and the other part of the electric power is supplied to the first load 510. The fifth situational condition indicates that the electric power is assigned to a first load 510 and a second load 520 by the power divider 300. In addition, the chargeable braking energy value 246, the first recoverable storage power value 412 and the second recoverable storage power value 422 are compared to generate one of a plurality of comparison results by the control unit 224. Table 2 lists the comparison results and the corresponding situational conditions.

TABLE 2

| Comparison result | Constraint 1 | Constraint 2 | Constraint 3 | Constraint 4 | Situational condition |
|---|---|---|---|---|---|
| 1 | N | N | N | N | Second situational condition |
| 2 | N | N | N | Y | Second situational condition |
| 3 | N | N | Y | N | Second situational condition |
| 4 | N | N | Y | Y | Third situational condition |
| 5 | N | Y | N | N | Fourth situational condition |
| 6 | N | Y | N | Y | Fifth situational condition |
| 7 | N | Y | Y | N | Fourth situational condition |
| 8 | N | Y | Y | Y | Fifth situational condition |
| 9 | Y | N | N | N | First situational condition |
| 10 | Y | N | N | Y | Third situational condition |
| 11 | Y | N | Y | N | First situational condition |
| 12 | Y | N | Y | Y | Third situational condition |
| 13 | Y | Y | N | N | Fourth situational condition |
| 14 | Y | Y | N | Y | Fifth situational condition |
| 15 | Y | Y | Y | N | Fifth situational condition |
| 16 | Y | Y | Y | Y | Fifth situational condition |

In Table 2, "Constraint 1" represents that the chargeable braking energy value 246 is larger than the first recoverable storage power value 412. "Constraint 2" represents that the first recoverable storage power value 412 is equal to zero. "Constraint 3" represents that the chargeable braking energy value 246 subtracted from first recoverable storage power value 412 is larger than the second recoverable storage power value 422. "Constraint 4" represents that the second recoverable storage power value 422 is equal to zero. N represents that the chargeable braking energy value 246, the first recoverable storage power value 412 and the second recoverable storage power value 422 do not match the corresponding constraint, and Y represents the chargeable braking energy value 246, the first recoverable storage power value 412 and the second recoverable storage power value 422 match the corresponding constraint. For example, the $1^{st}$ comparison result shows that constraints 1-4 are all "N", so that the chargeable braking energy value 246 is smaller than or equal to the first recoverable storage power value 412, and the first recoverable storage power value 412 is larger than zero. In addition, the chargeable braking energy value 246 subtracted from the first recoverable storage power value 412 is smaller than or equal to the second recoverable storage power value 422, and the second recoverable storage power value 422 is larger than zero. Under the above condition, the electric power may be assigned to a first load 510 and a second load 520 by the power divider 300. In other words, the control module 220 of the energy charge controller 200 can generate the sixteen comparison results according to the four constraints, and each comparison result is corresponding to one of the five situational conditions 252. Therefore, the energy (electric power) of the power divider 300 can be adaptively adjusted to increase charge efficiency by the control module 220 so as to increase the length of working life of the energy storage device 400 and reduce fuel consumption.

Figure 2:
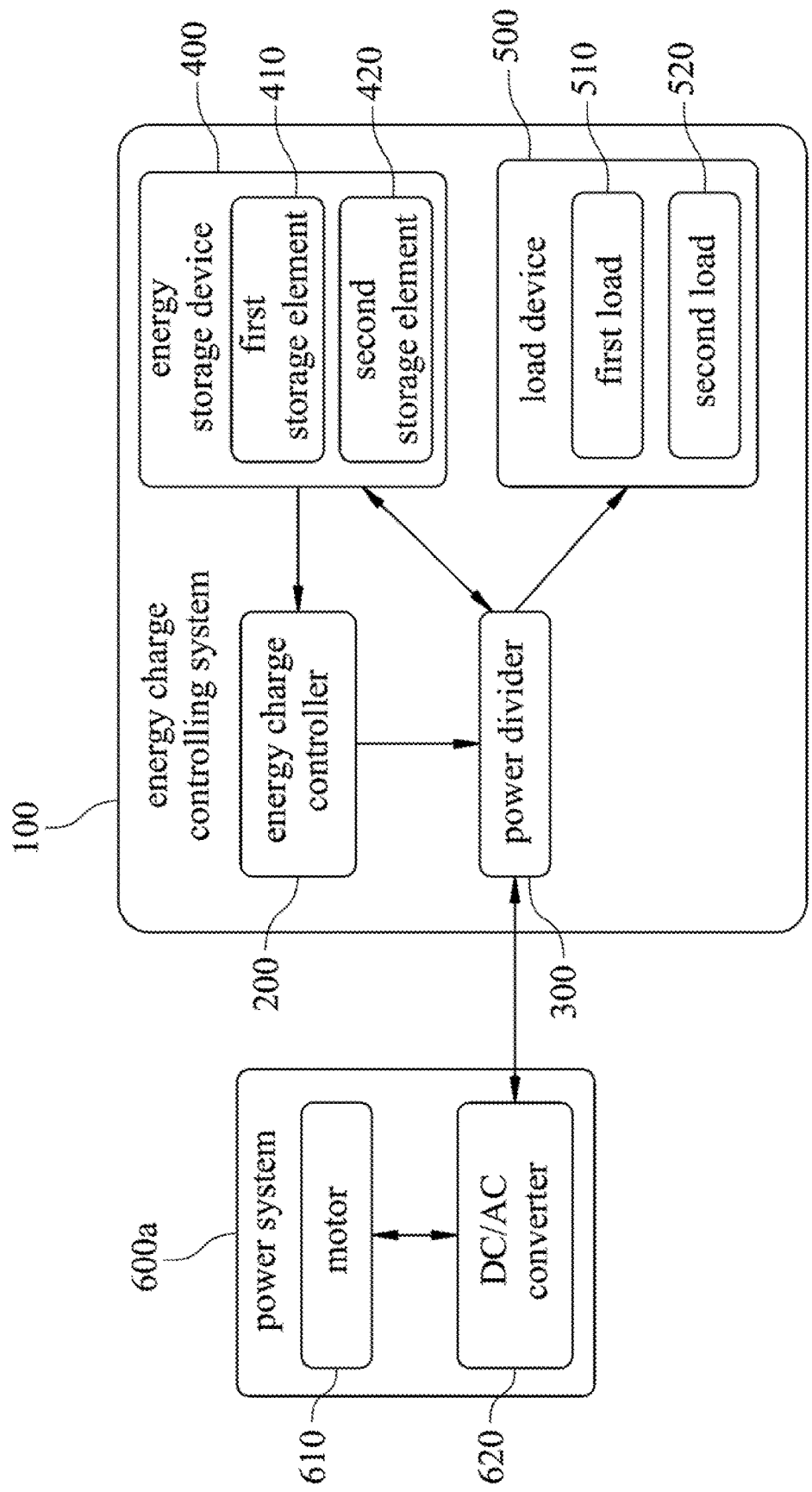
FIG. 2 is a block diagram showing the energy charge controlling system connected to a power system of an electric vehicle according to one embodiment of the present disclosure.
Figure 3:
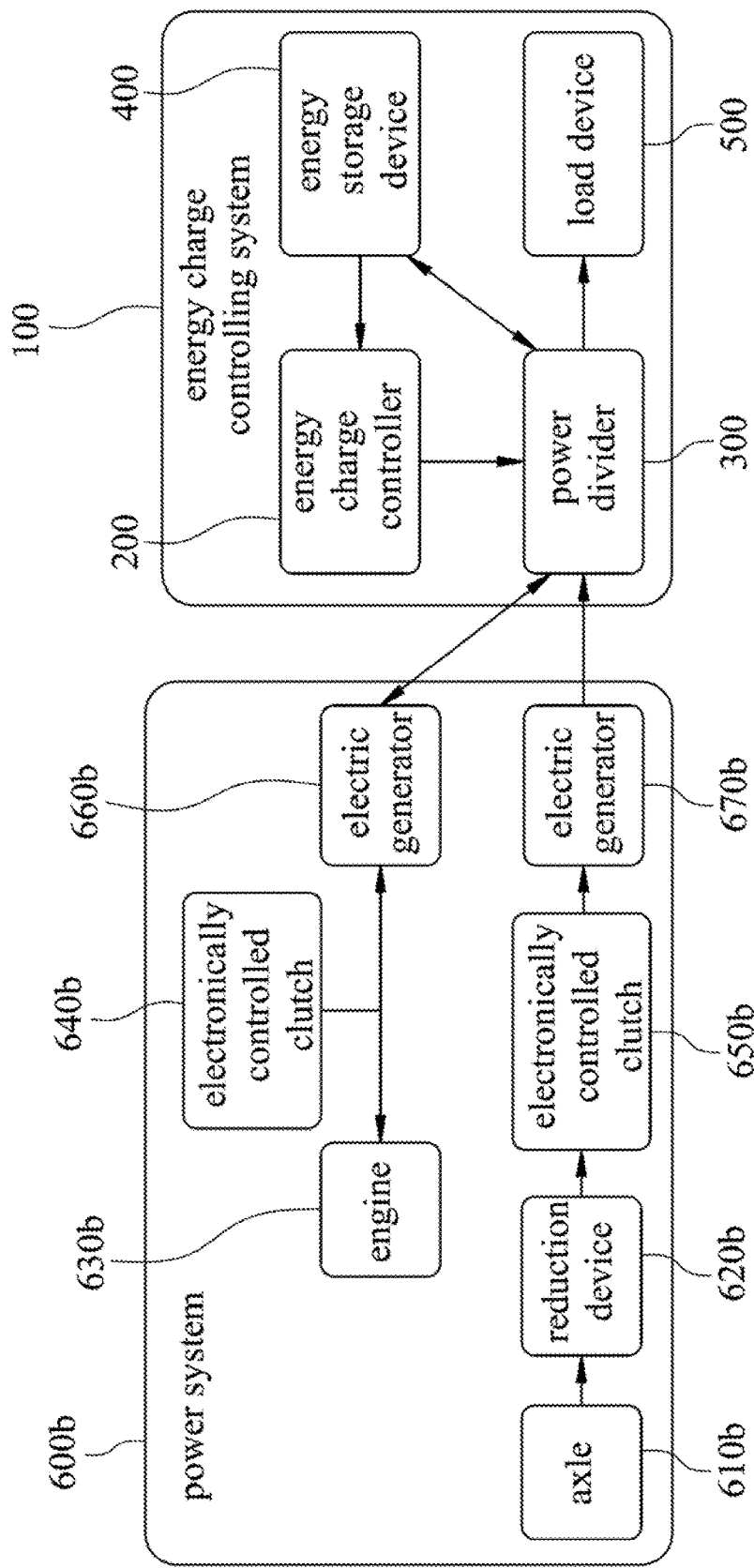
FIG. 3 is a block diagram showing the energy charge controlling system connected to a power system of a gasoline vehicle according to one embodiment of the present disclosure.

The power divider 300 is configured to receive the electric power from a power system 600a or a power system 600b, as shown in FIGS. 2 and 3. The electric power of the power divider 300 is DC energy. The electric power is assigned to the energy storage device 400 or the load device 500 by the power divider according to one of the situational conditions 252. The power divider 300 may include a first power dividing element and a second power dividing element (not shown). The electric power may be assigned to the first storage element 410 or the first load 510 by the first power dividing element. The electric power may be assigned to the second storage element 420 or the second load 520 by the second power dividing element. The first power dividing element and the second power dividing element can be used to efficiently provide the electric power to the energy storage device 400 and the load device 500. Moreover, the power divider 300 may be combined with a DC/DC converter to control the assignment of electric power.

The energy storage device 400 is electrically connected to the power divider 300 for transferring the electric power and the control unit 224 of the control module 220 for receiving one of the five situational conditions 252. The energy storage device 400 can provide the electric power to the power divider 300 for driving the power system, so that the power divider 300, the energy storage device 400 and the power system can conduct bidirectional power transmission. The energy storage device 400 includes a first storage element 410 and a second storage element 420. The energy storage device 400 generates a first recoverable storage power value 412 and a second recoverable storage power value 422 from the first storage element 410 and the second storage element 420, respectively. The first storage element 410 and the second storage element 420 are corresponding to the first recoverable storage power value and the second recoverable storage power value, respectively. In other words, the energy stored in the first storage element 410 is corresponding to the first recoverable storage power value, and the energy stored in the second storage element 420 is corresponding to the second recoverable storage power value. The first storage element 410 can be a high voltage storage element, and the second storage element 420 can be a low voltage storage element. The first storage element 410 and the second storage element 420 can be any type of rechargeable battery. Hence, the control unit 224 is configured to select and output one of the situational conditions 252 to the power divider 300 by comparing the chargeable braking energy value 246, the first recoverable storage power value 412 and the second recoverable storage power value 422, and then the electric power can be assigned to the energy storage device 400 and the load device 500 by the power divider 300 according to one of the situational conditions 252. Moreover, the energy storage device 400 may determine the amount of rechargeable energy of each storage element according to a state of charge (SOC), a state of health (SOH), a voltage, a current and a temperature of each storage element, so that the first recoverable storage power value 412 and the second recoverable storage power value 422 may be inferred from the status of each storage element.

The load device 500 includes a first load 510 and a second load 520. The first load 510 and the second load 520 both are electrically connected to the power divider 300. The first load 510 may be a high voltage load, and the second load 520 may be a low voltage load. For example, in Table 2, the 6 comparison result shows that constraints 2 and 4 both are "Y", so that the first recoverable storage power value 412 and the second recoverable storage power value 422 both are equal to zero. In other words, the first storage element 410 and the second storage element 420 both are fully charged. The power divider 300 may provide the electric power to the first load 510 and the second load 520 of the load device 500 so as to avoid energy consumption and increase working lifetime of the energy storage device 400.

FIG. 2 is a block diagram showing the energy charge controlling system 100 connected to a power system 600a of an electric vehicle according to one embodiment of the present disclosure; and FIG. 3 is a block diagram showing the energy charge controlling system 100 connected to a power system 600b of a gasoline vehicle according to one embodiment of the present disclosure. The power system 600a and the power system 600b are located in the electric vehicle and the conventional gasoline vehicle, respectively. The energy charge controlling system 100 can be applied to the electric vehicle or the conventional gasoline vehicle. In FIG. 2, the power system 600a includes a motor 610 and a DC/AC converter 620. The DC/AC converter 620 is connected to the motor 610 and the power divider 300. In FIG. 3, the power system 600b includes an axle 610b, a reduction device 620b, an engine 630b, two electronically controlled clutches 640b, 650b and two electric generators 660b, 670b. The reduction device 620b is connected to the axle 610b and the electronically controlled dutch 650b. The electric generator 670b is connected to the electronically controlled clutch 650b and the power divider 300. The electric generator 660b is connected to the engine 630b, the electronically controlled dutch 640b and the power divider 300. The operation of the power system 600a can be adjusted by the energy charge controlling system 100. The operation of the power system 600b where the electric generators 660b, 670b combined with the electronically controlled clutches 640b, 650b can also be adjusted by the energy charge controlling system 100 for reducing fuel consumption and increasing the length of working life of the energy storage device 400.

Figure 4:
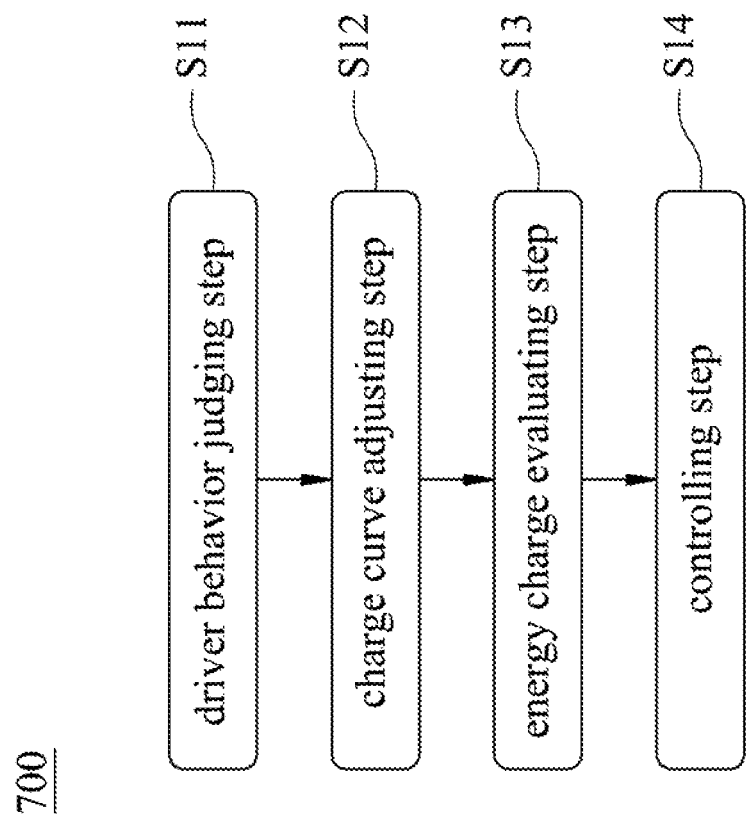
FIG. 4 is a flow chart showing an energy charge controlling method according to one embodiment of the present disclosure.

FIG. 4 is a flow chart showing an energy charge controlling method 700 according to one embodiment of the present disclosure. The energy charge controlling method 700 includes a driver behavior judging step S11, a charge curve adjusting step S12, an energy charge evaluating step S13 and a controlling step S14. Please also refer to FIG. 1. The driver behavior judging step S11 is for evaluating the driving mode signal 242 by the driver behavior judgment unit 214 based on the vehicle speed signal 232, the accelerator pedal motion signal 234 and the brake pedal motion signal 236. The charge curve adjusting step S12 is for evaluating the brake charging target datum 244 by a charge curve adjustment unit 214 based on the driving mode signal 242. The energy charge evaluating step S13 is for evaluating the chargeable braking energy value 246 by the energy charge evaluation unit 216 based on the brake charging target datum 244 and the vehicle speed signal 232. The controlling step S14 is for selecting and outputting one of the situational conditions 252 based on comparing the chargeable braking energy value 246, the first recoverable storage power value 412 and the second recoverable storage power value 422 by the control unit 224 of the control module 220.

Figure 5:
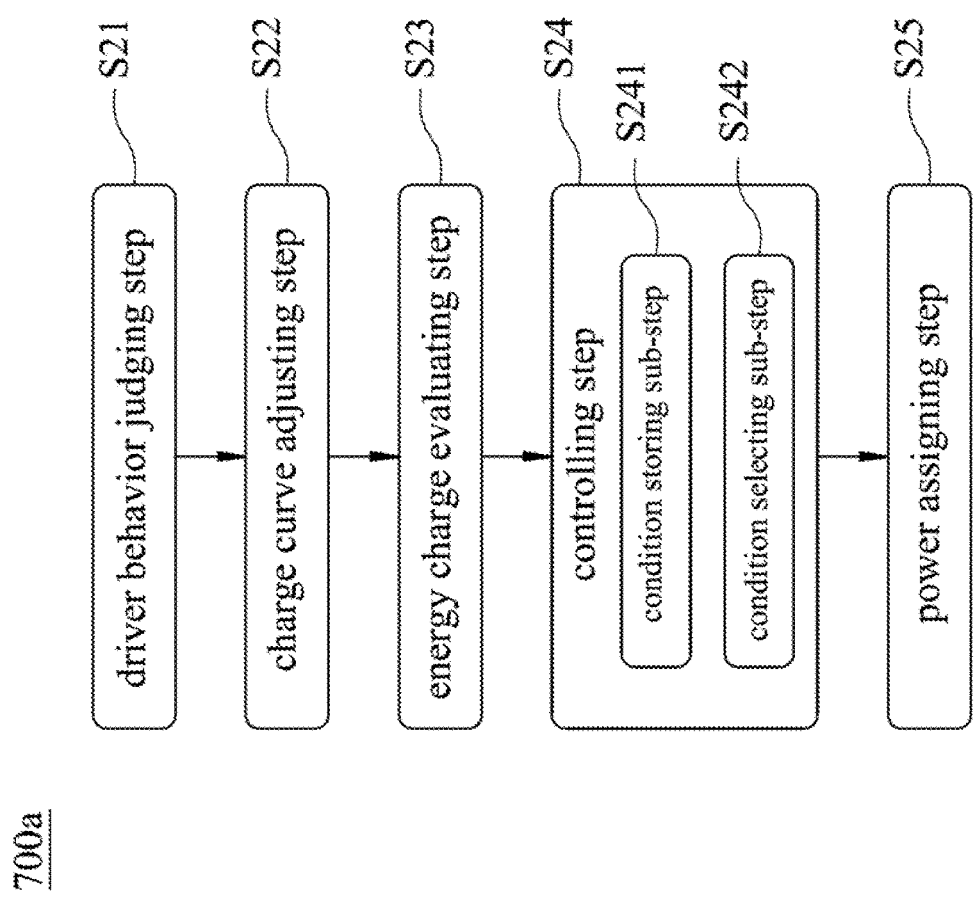
FIG. 5 is a flow chart showing an energy charge controlling method according to another embodiment of the present disclosure.

FIG. 5 is a flow chart showing an energy charge controlling method 700a according to another embodiment of the present disclosure. The energy charge controlling method 700a includes a driver behavior judging step S21, a charge curve adjusting step S22, an energy charge evaluating step S23, a controlling step S24 and a power assigning step S25. In FIG. 5, the details of the driver behavior judging step S21, a charge curve adjusting step S22 and an energy charge evaluating step S23 are the same as the driver behavior judging step S11, a charge curve adjusting step S12 and an energy charge evaluating step S13 of FIG. 4, respectively. In FIG. 5, the controlling step S24 further includes a condition storing sub-step S241 and a condition selecting sub-step S242. The energy charge controlling method 700a further includes the power assigning step S25. The condition storing sub-step S241 is for storing the situational conditions 252 in the memory unit 222. The condition selecting sub-step S242 is for comparing the chargeable braking energy value, the first recoverable storage power value 412 and the second recoverable storage power value 422 to generate the comparison result by the control unit 224, and then the condition selecting sub-step S242 is for selecting and outputting one of the situational conditions 252 to a power divider 300. The comparison result is corresponding to one of the situational conditions 252. The power assigning step S25 is for assigning the electric power to the energy storage device 400 or the load device 500 by the power divider 300 according to one of the situational conditions 252. In detail, the electric power is assigned to the first storage element 410, the second storage element 420, the first load 510 or the second load 520 by the power divider 300 according to one of the five situational conditions 252. Hence, the electric power from the power system can be adaptively adjusted to increase charge efficiency by the energy charge controlling system 100 and the energy charge controlling methods 700, 700a so as to increase the working lifetime of the energy storage device 400. Moreover, the energy charge controlling methods 700, 700a are suitable for various types of vehicles, especially for large transport vehicles or the vehicle having multiple electrical devices, such as air conditioning compressors, air compressors, water pumps, fuel pumps and so on. Therefore, combination of the energy charge controlling system 100 and the energy charge controlling methods 700, 700a can increase the working lifetime of the energy storage device 400 and reduce carrying capacity of the energy storage device 400.

According to the aforementioned embodiments, the advantages of the present disclosure are described as follows.

1. The energy charge controller, energy charge controlling system and method thereof of the present disclosure can increase charge efficiency by adaptively controlling the electric power assignment and avoid energy consumption.

2. The energy charge controller, energy charge controlling system and method thereof of the present disclosure can increase the working lifetime of the energy storage device and reduce carrying capacity of the energy storage device.

3. The energy charge controller, energy charge controlling system and method thereof of the present disclosure can reduce fuel consumption and extend the operating time of the energy storage device.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An energy charge controller for controlling electrical energy of a vehicle, the energy charge controller comprising:
   an estimation module comprising:
      a driver behavior judgment unit configured to generate and output a driving mode signal by a vehicle speed signal, an accelerator pedal motion signal and a brake pedal motion signal;
      a charge curve adjustment unit electrically connected to the driver behavior judgment unit for receiving the driving mode signal, wherein the driving mode signal is evaluated to generate a brake charging target datum by the charge curve adjustment unit; and
      an energy charge evaluation unit electrically connected to the charge curve adjustment unit for receiving the brake charging target datum and the vehicle speed, wherein the brake charging target datum and the vehicle speed are evaluated to generate a chargeable braking energy value by the energy charge evaluation unit; and
   a control module electrically connected to the estimation module for receiving the chargeable braking energy value and at least one recoverable storage power value, wherein the control module comprises a control unit and a memory unit, the memory unit is electrically connected to the control unit and stored a plurality of situational conditions, and the control unit is configured to select and output one of the situational conditions to the vehicle by comparing the chargeable braking energy value and the recoverable storage power value.

2. The energy charge controller of claim 1, wherein the chargeable braking energy value and the recoverable storage power value are compared to generate a comparison result by the control unit, the comparison result represents that the chargeable braking energy value is larger than the recoverable storage power value, or the chargeable braking energy value is smaller than or equal to the recoverable storage power value.

3. The energy charge controller of claim 1, wherein the brake charging target datum comprises a target vehicle speed which changes over time, the energy charge evaluation unit is configured to evaluate the chargeable braking energy value by the target vehicle speed and the vehicle speed, and the target vehicle speed is smaller than the vehicle speed.

4. An energy charge controlling system, comprising:
   a power divider configured to receive an electric power;
   an energy storage device electrically connected to the power divider, wherein the energy storage device comprises a first storage element and generates a first recoverable storage power value, and the first storage element is corresponding to the first recoverable storage power value;
   a load device electrically connected to the power divider; and
   an energy charge controller electrically connected to the power divider and the energy storage device, the energy charge controller comprising:
      an estimation module comprising:
         a driver behavior judgment unit configured to generate and output a driving mode signal according to a vehicle speed, an accelerator pedal motion signal and a brake pedal motion signal;
         a charge curve adjustment unit electrically connected to the driver behavior judgment unit for receiving the driving mode signal, wherein the driving mode signal is evaluated to generate a brake charging target datum by the charge curve adjustment unit; and an energy charge evaluation unit electrically connected to the charge curve adjustment unit for receiving the brake charging target datum and the vehicle speed, wherein the brake charging target datum and the vehicle speed are evaluated to generate a chargeable braking energy value by the energy charge evaluation unit; and a control module electrically connected to the estimation module for receiving the chargeable braking energy value and the first recoverable storage power value, wherein the control module comprises a control unit and a memory unit, the memory unit is electrically connected to the control unit and stored a plurality of situational conditions, the control unit is configured to select and output one of the situational conditions to the power divider by comparing the chargeable braking energy value and the first recoverable storage power value, and the electric power is assigned to the energy storage device by the power divider according to one of the situational conditions.

5. The energy charge controlling system of claim 4, wherein the energy storage device further comprising:

a second storage element electrically connected to the power divider and the control unit, wherein the energy storage device generates a second recoverable storage power value, the second storage element is corresponding to the second recoverable storage power value, the second recoverable storage power value is outputted to the control unit from the energy storage device, and the control unit is configured to select and output one of the situational conditions to the power divider by comparing the chargeable braking energy value, the first recoverable storage power value and the second recoverable storage power value.

6. The energy charge controlling system of claim 5, wherein the load device comprises a first load and a second load, the first load and the second load both are connected to the power divider, and the electric power is assigned to the first storage element, the second storage element, the first load or the second load by the power divider according to one of the situational conditions.

7. The energy charge controlling system of claim 6, wherein the situational conditions comprise:

a first situational condition indicating that the electric power is assigned to the first storage element and the second storage element;

a second situational condition indicating that the electric power is assigned to the first storage element;

a third situational condition indicating that the electric power is assigned to the first storage element and the second load;

a fourth situational condition indicating that the electric power is assigned to the second storage element and the first load; and a fifth situational condition indicating that the electric power is assigned to the first load and the second load.

8. An energy charge controlling method, comprising:

performing a driver behavior judging step for evaluating a driving mode signal by a driver behavior judgment unit based on a vehicle speed, an accelerator pedal motion signal and a brake pedal motion signal;

performing a charge curve adjusting step for evaluating the driving mode signal to generate a brake charging target datum by a charge curve adjustment unit;

performing an energy charge evaluating step for evaluating the brake charging target datum and the vehicle speed to generate a chargeable braking energy value by an energy charge evaluation unit; and performing a controlling step for selecting and outputting one of a plurality of situational conditions based on comparing the chargeable braking energy value and a recoverable storage power value by a control unit.

9. The energy charge controlling method of claim 8, wherein the controlling step comprises:

performing a condition storing sub-step for storing the situational conditions in a memory unit; and performing a condition selecting sub-step for comparing the chargeable braking energy value with the recoverable storage power value to generate a comparison result by the control unit, wherein the condition selecting sub-step is for selecting and outputting one of the situational conditions to a power divider, and the comparison result is corresponding to one of the situational conditions.

10. The energy charge controlling method of claim 8, further comprising:

performing a power assigning step for assigning an electric power to an energy storage device and a load device by a power divider according to one of the situational conditions.

* * * * *